US006941014B2

United States Patent
Lin et al.

(10) Patent No.: US 6,941,014 B2
(45) Date of Patent: Sep. 6, 2005

(54) METHOD AND APPARATUS FOR SEGMENTING AN IMAGE USING A COMBINATION OF IMAGE SEGMENTATION TECHNIQUES

(75) Inventors: Ying-wei Lin, Penfield, NY (US); Martin E. Banton, Fairport, NY (US); William A. Fuss, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 663 days.

(21) Appl. No.: 09/737,515

(22) Filed: Dec. 15, 2000

(65) Prior Publication Data

US 2002/0076103 A1 Jun. 20, 2002

(51) Int. Cl.$^7$ ................................................ G06K 9/34
(52) U.S. Cl. ........................ 382/176; 382/243; 358/462
(58) Field of Search ................................ 382/164, 171, 382/173, 175, 176, 177, 232, 243; 358/462

(56) References Cited

U.S. PATENT DOCUMENTS

| | | | |
|---|---|---|---|
| 5,293,430 A | | 3/1994 | Shiau et al. |
| 5,341,266 A | | 8/1994 | Grove |
| 5,586,200 A | * | 12/1996 | Devaney et al. ............ 382/232 |
| 5,687,303 A | | 11/1997 | Motamed et al. |
| 5,696,842 A | * | 12/1997 | Shirasawa et al. .......... 382/176 |
| 5,765,029 A | | 6/1998 | Schweid et al. |
| 5,778,092 A | * | 7/1998 | MacLeod et al. ........... 382/176 |
| 5,850,474 A | | 12/1998 | Fan et al. |
| 5,915,044 A | * | 6/1999 | Gardos et al. .............. 382/236 |
| 6,006,013 A | | 12/1999 | Rumph et al. |
| 6,192,155 B1 | * | 2/2001 | Fan ............................ 382/232 |
| 6,400,844 B1 | | 6/2002 | Fan et al. |
| 6,625,333 B1 | * | 9/2003 | Wang et al. ................ 382/300 |
| 6,650,775 B1 | | 11/2003 | Harrington |

2003/0081828 A1    5/2003   Curry

OTHER PUBLICATIONS

Ricardo L. de Queiroz, "Compression of Compound Documents", International Conference on Image Processing (ICIP), Oct. 24–28, 1999, Kobe, JAPAN (5 pages).

Hui Chang and Charles A. Bouman, "Multilayer Document Compression Algorithm", International Conference on Image Processing (ICIP), Oct. 24–28, 1999, Kobe, JAPAN (5 pages).

Simon Haykin, *Neutral Networks—A Comprehensive Foundation* (Second Edition), Table of Contents and Chapter 7—Committee Machines (pp. 351–391), Prentice–Hall, Inc. 1999.

* cited by examiner

*Primary Examiner*—Kanjibhai Patel
*Assistant Examiner*—Ali Bayat
(74) *Attorney, Agent, or Firm*—Fay, Sharpe, Fagan, Minnich & McKee, LLP

(57) ABSTRACT

This invention relates to a method and apparatus for segmenting an image using a combination of image segmentation techniques. More particularly, the invention is directed to an improved image segmentation technique for use in an image processing system that performs at least two distinct image segmentation processes on an image and combines the results to obtain a combined multi-layer representation of the image that can be suitably processed. In a specific example, a block based segmentation technique is performed on an image to generate a MRC (mixed raster content) representation—having foreground, background and selector layers. A pixel based segmentation technique is also performed on the image to generate rendering hints. The MRC representation and the rendering hints are then combined to obtain a four (4) layer representation of the image. The four layer representation is subsequently processed as required by the image processing system, e.g. compressed and stored.

25 Claims, 7 Drawing Sheets

METHOD AND APPARATUS FOR SEGMENTING AN IMAGE USING A COMBINATION OF IMAGE SEGMENTATION TECHNIQUES

BACKGROUND OF THE INVENTION

This invention relates to a method and apparatus for segmenting an image using a combination of image segmentation techniques. More particularly, the invention is directed to an improved image segmentation technique for use in an image processing system that performs at least two distinct image segmentation processes on an image and combines the results to obtain a combined multi-layer representation of the image that can be suitably processed. In a specific example, a block based segmentation technique is performed on an image to generate a MRC (mixed raster content) representation—having foreground, background and selector layers. A pixel based segmentation technique is also performed on the image to generate rendering hints. The MRC representation and the rendering hints are then combined to obtain a four (4) layer representation of the image. The four layer representation is subsequently processed as required by the image processing system, e.g. compressed and stored.

While the invention is particularly directed to the art of combining image segmentation techniques to obtain a useful result, and will be thus described with specific reference thereto, it will be appreciated that the invention may have usefulness in other fields and applications.

By way of background, various methods for segmenting images are known. In general, such image segmentation methods are implemented to satisfy a wide variety of image processing needs. For example, when an image is sought to be compressed, it is advantageous to first determine the types of objects (e.g. continuous tone objects, background portions, text, . . . etc.) that are contained in the image. Compression techniques, depending on their precise nature, tend to most effectively compress only certain types of image objects. Thus, images are segmented by object type so that appropriate compression techniques may be applied to each of the respective object types of the image. To illustrate, it is well known in the image processing field that JPEG compression techniques work fairly well on continuous tone pixel maps but do not operate effectively on text. Conversely, the Lempel-Ziv Welch compression techniques do not perform adequately on scanned pixel maps.

Moreover, the various types of image segmentation methods each possess relative strengths. For example, pixel based image segmentation methods allow for improved image rendering capabilities over other segmentation methods. In this regard, pixel level segmentation methods generate pixel level rendering hints—which are pieces of information that indicate certain characteristics about an image. For example, a rendering hint may indicate the location of an edge within an image. Corresponding windows (whereby all pixels within a window have the same rendering hints) are also utilized. Although the generation of rendering hints and categorization using window identifications are advantageous features of pixel level segmentation from the standpoint of image rendering, a severe disadvantage of such methods is that compression ratios of a pixel based segmented image are not acceptable for many applications.

Other image segmentation methods that are well known are referred to as block based segmentation methods. That is, the subject image is segmented on a block-by-block basis as opposed to a pixel-by-pixel basis. Block based image segmentation methods attain improved compression ratios over pixel based methods and also are conducive to generating mixed raster content (MRC) data for ease of compression. The disadvantage of block based image segmentation methods, however, is that rendering hints are not effectively generated using these methods. Even if they are generated, use thereof tends to place artifacts on the rendered image.

As such, a segmentation system that combines the advantages of the above referenced segmentation methods, and others, and utilizes such advantages for improved rendering is desired.

The present invention contemplates a new and improved image segmentation method and apparatus that resolves the above-referenced difficulties and others.

SUMMARY OF THE INVENTION

A method and apparatus for segmenting an image using a combination of image segmentation techniques are provided.

In one aspect of the invention, a method comprises steps of obtaining image data, inputting the image data into a first image segmentation module, generating first segmentation data by the first image segmentation module, the first image segmentation data representing at least one first characteristic of the image data, inputting the image data into a second image segmentation module, generating second image segmentation data by the second image segmentation module, the second image segmentation data representing at least one second characteristic of the image data, and integrating the first image segmentation data with the second image segmentation data to obtain modified image data.

In another aspect of the invention, inputting the image data to the first image segmentation module and inputting of the image data to the second image segmentation module are accomplished concurrently.

In another aspect of the invention, the generating of the first image segmentation data comprises generating first characteristic data representing a background layer, a selector layer, and a foreground layer of the image data.

In another aspect of the invention, the generating of the second image segmentation data comprises generating second characteristic data representing rendering hints.

In another aspect of the invention, the system for implementing the method according to the present invention is provided.

In another aspect of the invention, the system comprises means for obtaining image data, means for generating first segmentation data, the first image segmentation data representing at least one first characteristic of the image data, means for generating second image segmentation data, the second image segmentation data representing at least one second characteristic of the image data and means for integrating the first image segmentation data with the second image segmentation data to obtain modified image data.

In another aspect of the invention, an image rendering system adapted for segmenting an image comprises a scanner operative to obtain image data, a bitmap generator operative to generate a bitmap corresponding to the image data, a first image segmentation module operative to generate first image segmentation data, the first image segmentation data representing at least one first characteristic of the image data, a second image segmentation module operative to generate second image segmentation data, the second image segmentation data representing at least one second characteristic of the image data, a combining module operative to combine the first image segmentation data with the second image segmentation data to obtain modified image data, a compression module operative to compress the modified image data, a storage module operative to store the compressed image data, a decompression module operative to decompress the stored image data and a print engine operative to render the image based on the decompressed data.

In another aspect of the invention, the system is included in a xerographic printing environment.

In another aspect of the invention, the print engine is a xerographic print engine.

In another aspect of the invention, the first image segmentation data comprises first characteristic data representing a background layer, a selector layer and a foreground layer of the image data.

In another aspect of the invention, the second image segmentation data comprises second characteristic data representing rendering hints.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention is directed to an image segmentation method and apparatus that combines the output of a variety of image segmentation modules to obtain an integrated result. This technique allows for the advantageous use of various segmentation methods on the same image. In this way, the same image is segmented a variety of different ways so that, depending on the ultimate use of the output obtained as a result of the implementation of the present invention, advantages of these various methods may be realized.

Figure 1:
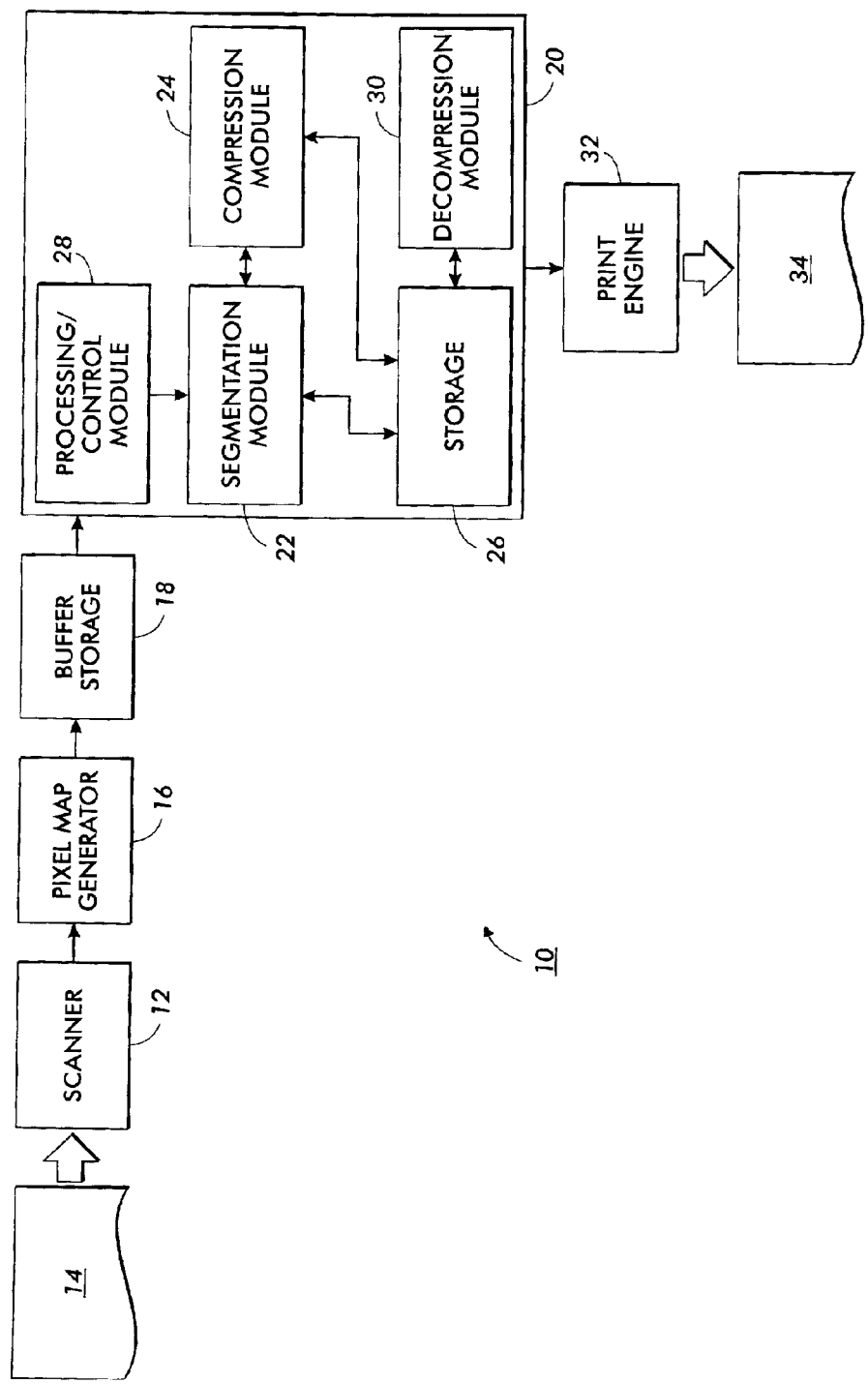
FIG. 1 is a block diagram of an image-rendering device incorporating the present invention.

Referring now to the drawings wherein the showings are for purposes of illustrating the preferred embodiments of the invention only and not for purposes of limiting same, FIG. 1 provides a view of an image rendering system into which the present invention is preferably incorporated. As shown, an image rendering system 10 includes a scanner 12 that scans an input document 14. The data output from the scanner is then input to a pixel map generator 16, which generates a pixel map that is stored in buffer storage 18. The data stored in the buffer storage 18 is then input to an image processing unit 20. The image processing unit 20 includes a segmentation module 22, a compression module 24, and a storage module 26. The image processing unit 20 also includes a processing and control module 28 as well as a decompression module 30. The image processing unit 20 is connected at its output to a print engine 32 which is operative to render an image in an output document 34.

It should be appreciated that the scanner 12, pixel map generator 16, and the storage buffer 18 are of conventional design and are operative to generate a scanned, rasterized image and a corresponding pixel map therefore, so that the image may be digitally stored in the buffer. This is accomplished using well-known techniques in the image rendering and image processing fields.

The image processing unit 20 performs conventional image processing techniques on the image in addition to performing steps of the method according to the present invention. As such, the image processing unit 20 is generally controlled by control module 28, but may well contain components that are not specifically shown in FIG. 1. In addition, the configuration and function of the compression module 24 and decompression module 30 depend on the types of compression and decompression schemes that are used in conjunction with the present invention. Many suitable compression and decompression schemes are well-known to those of skill in this field. Further, the storage device 26 may take any suitable form that can accommodate storage of compressed image data.

It is also to be understood that the print engine 32 is preferably a xerographic print engine that is well known in the art and can be used in a xerographic printing environment. However, any suitable print engine will suffice.

Figure 2:
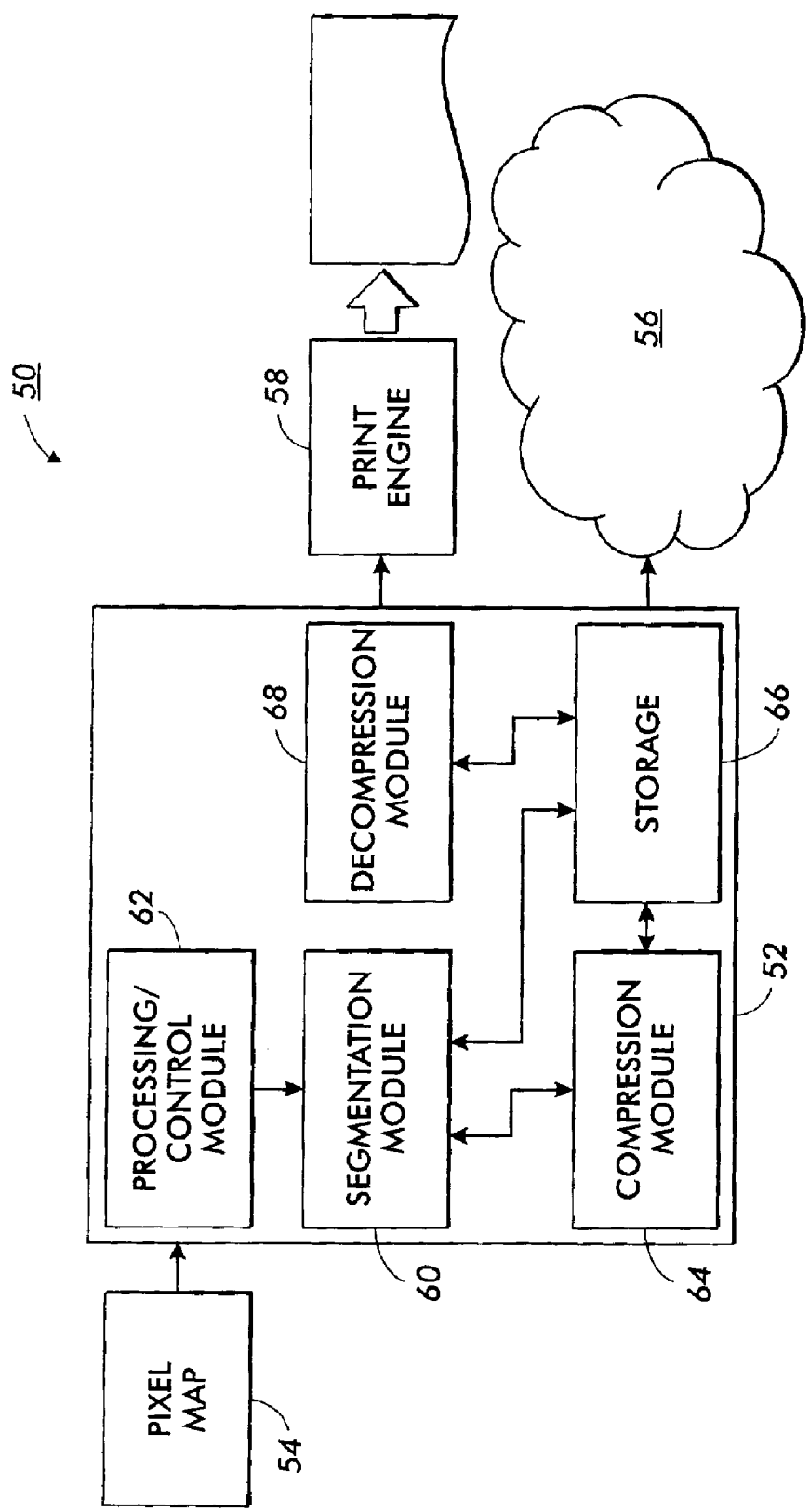
FIG. 2 is a block diagram of an alternative image-rendering device incorporating the present invention.

Referring now to FIG. 2, an alternative environment into which the present invention may be incorporated is illustrated. More specifically, an image rendering system 50 includes an image processing unit 52 that is operative to receive a pixel map 54, process the pixel map 54, and output appropriate data based on the processing to a network 56 or print engine 58.

It is to be appreciated that the pixel map 54 may be generated within a network and digitally stored prior to its input to the image processing unit 52. Other various known ways of generating a pixel map or a bit map may also be used. The image processing unit 52 takes the form similar to the image processing unit 20 in that it includes the segmentation module 60, the processing and control module 62, a compression module 64, a storage module 66 and a decompression module 68. Of course, if the compressed image is transmitted over a network 56, the decompression of that image will preferably occur at the receiver. For example, decompression may occur within a fax machine, another processing terminal, . . . etc. The network 56 may be a local area network, a wide area network, or the Internet. Like the print engine 32 of FIG. 1, it is also to be understood that the print engine 58 is preferably a xerographic print engine that is well known in the art and can be used in a xerographic printing environment. However, any suitable print engine will suffice.

Figure 3:
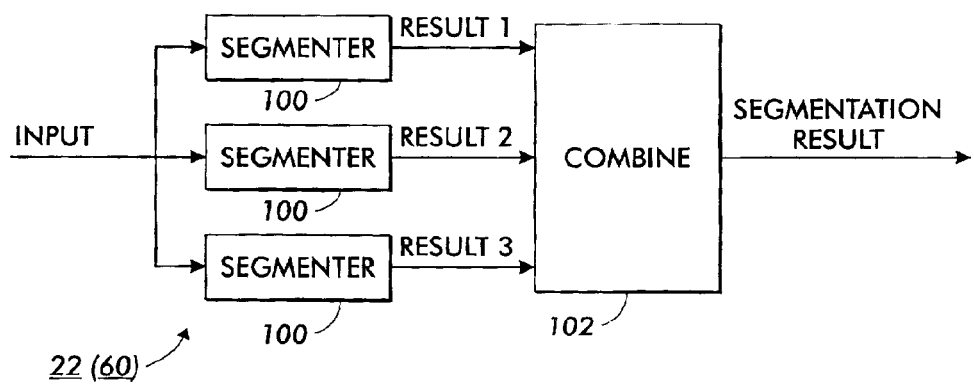
FIG. 3 is a block diagram of an image segmentation module according to the present invention.

As noted above, the present invention may be applied in both of the environments described in connection with FIGS. 1 and 2, as well as others. In either case shown, referring now to FIG. 3, the segmentation module 22 (or 60) includes a plurality of distinct segmentation modules 100. Each such segmentation module 100 is operative to generate image segmentation data representing various characteristics of the image data. Of course, it is to be appreciated that segmentation becomes more robust with the addition of further segmentation modules.

This image segmentation data is then combined, or integrated, at module 102 and the overall segmentation result is output. Preferably, the segmentation modules 100 are each distinct from one another to the extent that they generate image segmentation data representing different characteristics of the image data. The combining module 102 then preferably generates data representing all of the characteristics for which segmentation was accomplished by integrating the results of each of the segmentation modules. This data can then be used advantageously for a variety of desired purposes within any image rendering or networked computer system, as illustratively shown in FIGS. 1 and 2.

Figure 4:
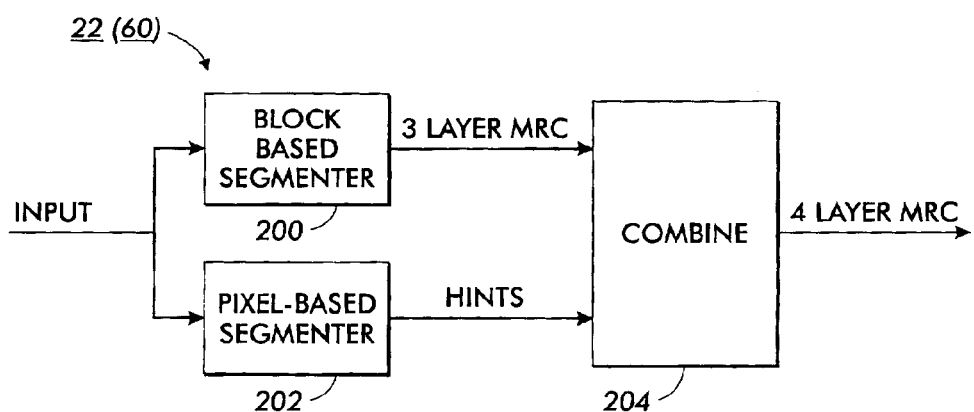
FIG. 4 is a block diagram illustrating a more specific embodiment of an image segmentation module according to the present invention.

With reference to FIG. 4, a more specific embodiment according to the present invention is illustrated. It is to be appreciated that the segmentation module illustrated in FIG. 4 is but one preferred embodiment of the present invention. It will be further appreciated that the details of implementation may be modified to suit the needs of a particular application. For example, different segmentation techniques than are shown could be used.

As shown, however, the image segmentation module 22 (or 60) is provided with a block based (or, more generally, object based) image segmentation module 200 and a pixel based image segmentation module 202. The input image is provided to each of these segmentation modules.

The output of the block based segmentation module 200 preferably is a three-layered mixed raster content file. Preferably, these layers represent background, foreground, and selector fields. Likewise, the pixel based image segmentation module 202 has an output. This output includes rendering hints. The outputs of each of the image segmentation modules 200 and 202 are combined at combining module 204 to produce a four layered mixed raster content (MRC) data file. Again, this modified (e.g. optimized) image data is utilized in manners accommodated by the particular system into which the invention is incorporated. Preferably, the data in the form using MRC representation is in a device independent color space such as Lab. As to the environment shown in FIGS. 1 and 2, the data is compressed, stored, transmitted and/or used in rendering.

With respect to the operation of the block based image segmentation module 200, any blocked or object based technique that outputs a layered MRC representation will suffice. However, a preferred exemplary segmentation technique that produces a three layered output is illustrated in U.S. Pat. No. 5,778,092 to MacLeod et al. (issued Jul. 7, 1998) entitled "Method and Apparatus For Compressing Color or Gray Scale Documents," commonly assigned and incorporated herein by reference.

As disclosed therein, the pixel map representing a color or gray-scale document is decomposed into a three-plane page format. The document format is comprised of a "foreground" plane, a "background" plane, and a "selector" plane. The "foreground" and "background" planes are stored at the same bit depth and number of colors as the original raw pixel map, but usually at reduced resolution. The "selector" plane is created and stored as a 1 bit per pixel bitmap.

Each of the planes is comprised of a corresponding map that may be ultimately compressed using a compression method suitable for the data contained in the plane, as referenced above. For example, the foreground and background planes may be compressed and stored using JPEG, while the selector plane may be compressed and stored using a symbol-based compression format. It would be apparent to one of skill in the art to compress and store the planes using other formats that are suitable for the intended use of the color document.

The "background" plane contains two things. First, it contains the color of the "background" of the page, including the color of tints, washes, etc. Second, it contains the continuous-tone pictures that are found on the page. The "foreground" or "ink" plane contains the "ink colors" of foreground items such as text.

The "selector" plane is stored at a higher resolution (e.g. 600 spots/inch for a 300 spots/inch original document). The purpose of the selector plane is to describe, for each pixel in the selector plane, whether to use the pixel value found in the background plane or the foreground plane. A "white" pixel in the selector plane (i.e. a logical zero value) means the pixel value should be taken from the corresponding pixel from the background plane. A "black" pixel in the selector plane (i.e. a logical one value) means that the pixel value should be taken from the corresponding pixel from the foreground plane. Preferably, the selector, foreground and background planes are brought to the same resolution before the selector is used to generate the single plane image.

Figure 5:
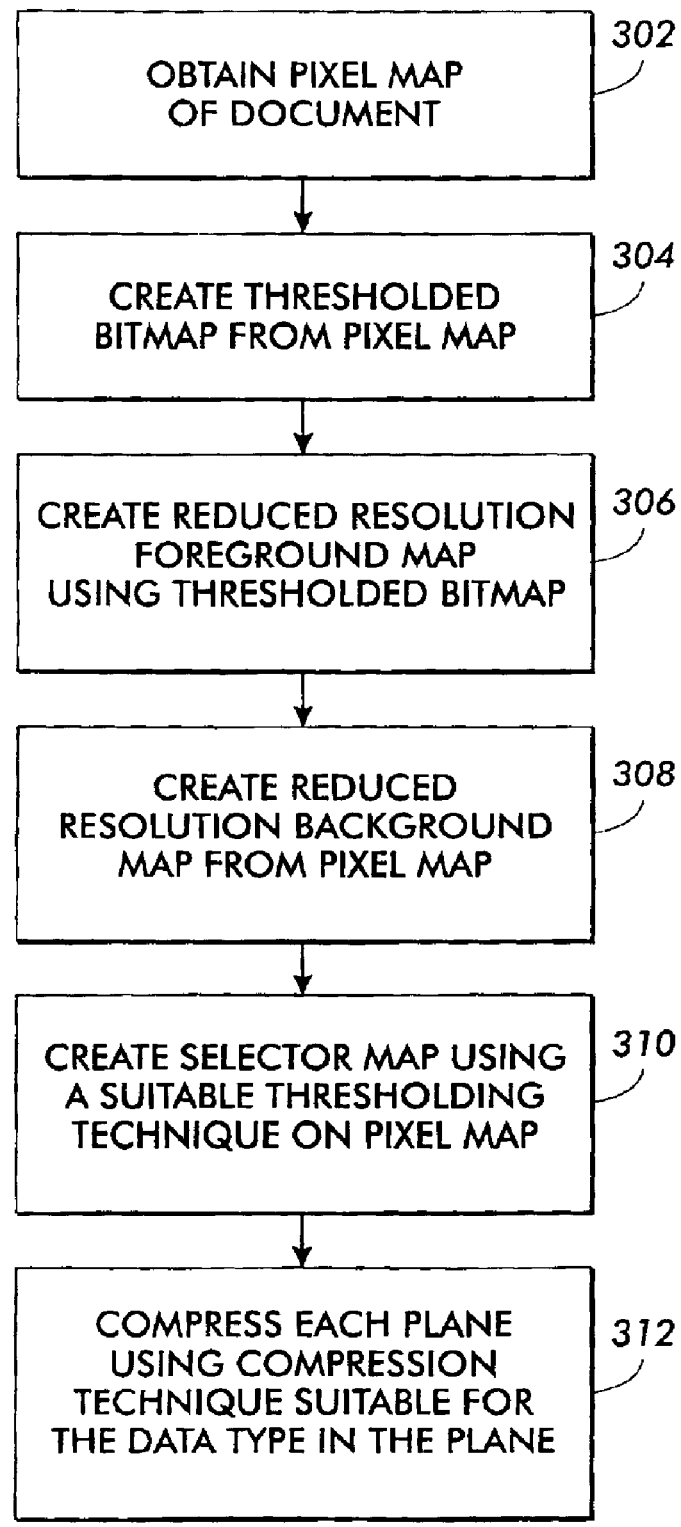
FIG. 5 is a flowchart illustrating an exemplary block based segmentation scheme.

Referring to FIG. 5, a pixel map representation of the document is obtained (step 302). This may be through scanning an original of the document, or by retrieving a stored pixel map representation of the document, depending on whether the system of FIG. 1 or FIG. 2 is implemented, for example. The pixel map representation is then analyzed to generate the information for the three planes. The first step of the analysis is to create a thresholded bitmap from the original pixel map (step 304). Generally, the thresholding step creates a new bitmap containing binary values is formed based on an adaptively determined threshold value. The thresholded bitmap is desirable since it eliminates undesirable artifacts. Using the threshold bitmap, a reduced resolution foreground map containing color (or gray scale) information of foreground items, such a text is computed (step 306).

The reduced resolution background map is then computed (step 308). In this step, the "image" or non-text portions are identified by an image segmentation process. This information is used to create the reduced resolution background map which contains background color information as well as continuous tone image information.

Next, the selector plane is computed (step 310). The selector plane is a bitmap computed using a suitable thresholding technique on the original pixel map. Of course, optionally, the layers are then compressed if required by the system (step 312).

With respect to the pixel based image segmentation module 202, any of a variety of pixel based schemes the are well known in the field may be utilized. Preferably, however, the pixel based scheme described in U.S. Pat. No. 5,850,474 to Fan et al. (issued Dec. 15, 1998) entitled "Apparatus and Method For Segmenting and Classifying Image Data" and U.S. Pat. No. 5,293,430 to Shiau et al. (issued Mar. 8, 1994) entitled "Automatic Image Segmentation Using Local Area Maximum and Minimum Image Signals", both of which are commonly assigned and incorporated herein by reference, is used.

Figure 6:
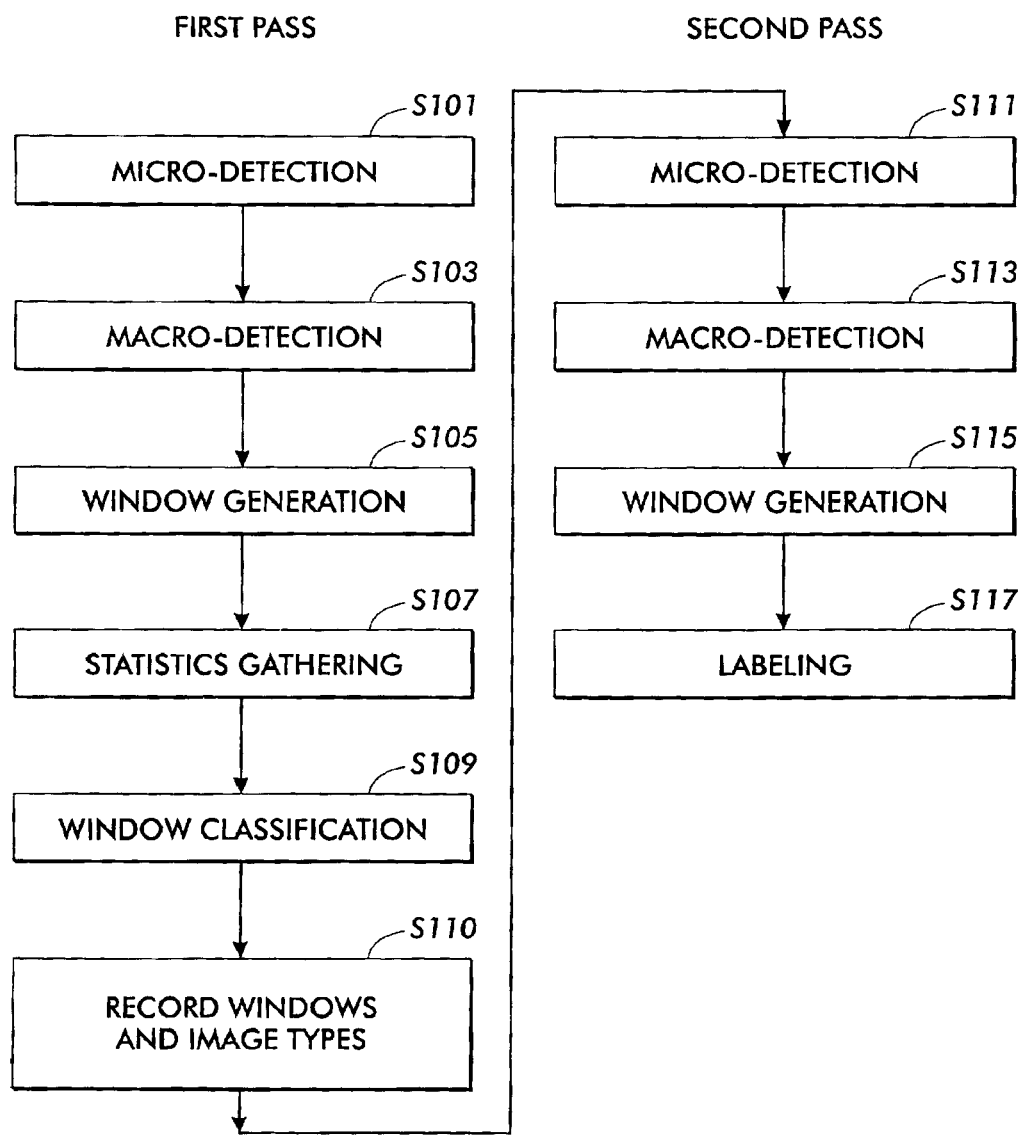
FIG. 6 is a flowchart illustrating an exemplary pixel based segmentation scheme.

In the disclosed method, as recited in U.S. Pat. No. 5,850,474, a block diagram of a two pass segmentation and classification method embodying the invention is shown in FIG. 6. The method segments a page of image data into windows, classifies the image data within each window as a particular image type and records information regarding the window and image type of each pixel. Once the image type for each window is known, further processing of the image data can be efficiently performed.

The image data comprises multiple scanlines of pixel image data, each scanline typically including intensity information for each pixel within the scanline. Typical image types include graphics, text, low-frequency halftone, high-frequency halftone, contone, etc.

During a first step S101, micro-detection is carried out. During micro-detection, multiple scanlines of image data are buffered into memory. Each pixel is examined and a preliminary determination is made as to the image type of the pixel. In addition, the intensity of each pixel is compared to the intensity of its surrounding neighboring pixels. A judgment is made as to whether the intensity of the pixel under examination is significantly different than the intensity of the surrounding pixels. When a pixel has a significantly different intensity than it neighboring pixels, the pixel is classified as an edge pixel.

During a second step S103, a macro-detection is performed. During the macro-detection step, the results of the micro-detection step are used to identify those pixels within each scanline that are edges and those pixels that belong to image runs. The image type of each image run is then determined based on the micro-detection results. The image type of an image run may also be based on the image type and a confidence factor of an adjacent image run of a previous scanline. Also, if an image run of a previous scanline was impossible to classify as a standard image type, but information generated during examination of the present scanline makes it possible to determine the image type of the image run of the previous scanline, that determination is made and the image type of the image run of the previous scanline is recorded.

In the next step S105, the image runs of adjacent scanlines are combined to form windows. A window is thus a contiguous area, of an arbitrary shape, in an image where all pixels are of the same class.

In the next step S107, statistics are gathered and calculated for each of the windows. The statistics are based on the intensity and macro-detection results for each of the pixels within a window.

In the next step S109, the statistics are examined in an attempt to classify each window. Windows that appear to contain primarily a single type of image data are classified according to their dominant image types. Windows that contain more than one type of image are classified as "mixed".

At the end of the first pass, in step S110, the beginning point and the image type of each of the windows is recorded.

During the second pass, in steps S111, S113 and S115, the micro-detection, macro-detection and window generation steps, respectively, are repeated. In the next step S117, labeling of the pixels occurs. During the labeling step, information about the image type and the window of each pixel is recorded. If a pixel is within a window that was classified as "mixed" during the first pass, the micro-detection, macro-detection and windowing steps performed during the second pass are used to assign an image type to the pixel. At the end of the labeling step, each pixel is labeled as a particular image type.

Once each portion of the image data has been classified according to standard image types, further processing of the image data can be efficiently performed. Because the micro-detection and macro-detection results from the first pass are not recorded for each pixel of the image, the memory requirements for a device embodying the invention are minimized. This helps to minimize the cost of such an apparatus.

Figure 7:
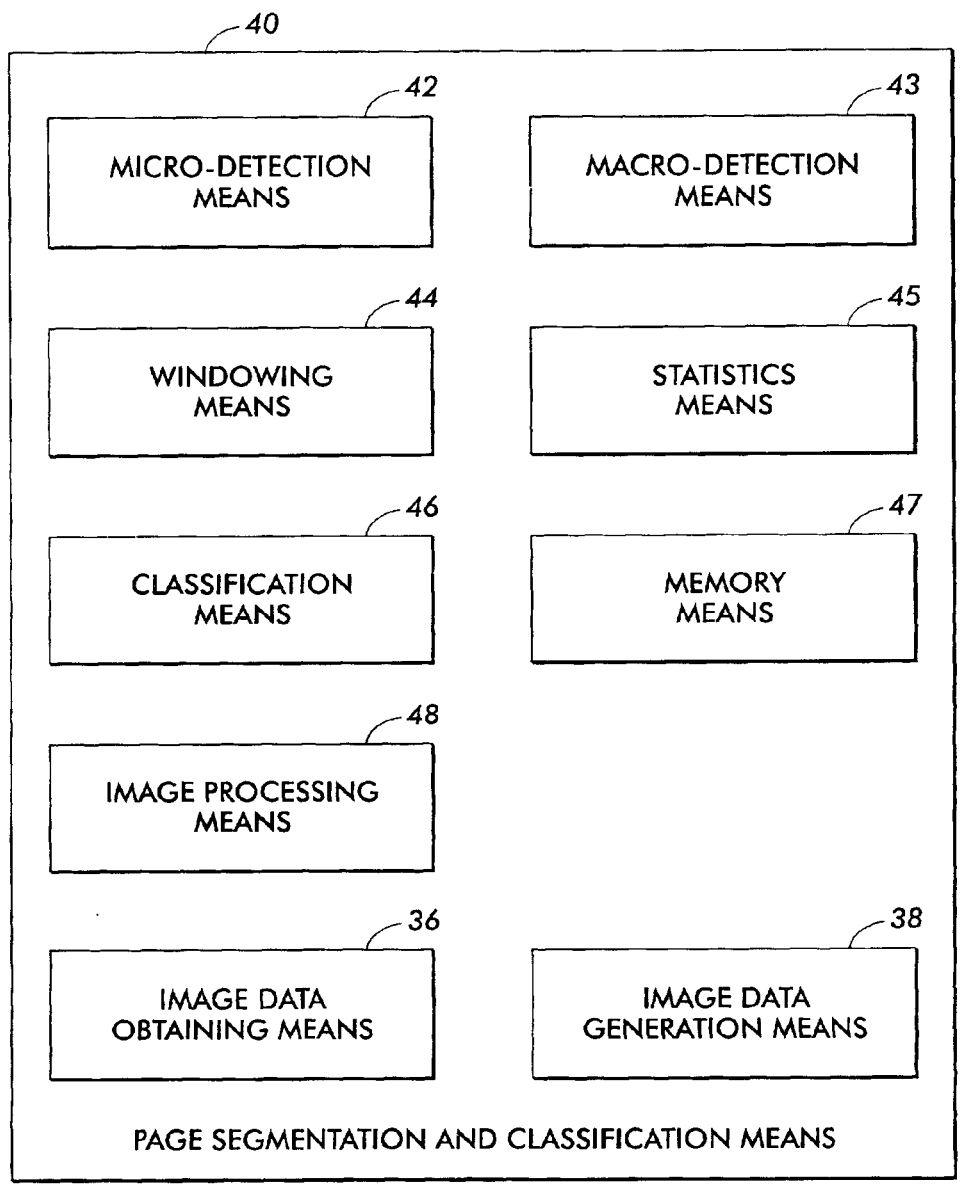
FIG. 7 is a block diagram of a system for implementing the scheme of FIG. 6; and, FIG. 8 is a flow chart illustrating the method according to the present invention.

A block diagram of a page segmentation and classification apparatus capable of performing the two pass method is shown in FIG. 7. The page segmentation and classification means 40 includes micro-detection means 42 for performing the micro-detection step, macro-detection means 43 for performing the macro-detection step and windowing means 44 for grouping the image runs of the scanlines together to form windows. The apparatus also includes statistics means 45 for gathering and calculating statistics regarding the pixels within each window and classification means 46 for classifying each of the windows as a particular image type based on the gathered statistics.

Memory means 47 are provided for recording the beginning points and image types of each of the windows and the beginning points and image types of any initially unknown image runs that were subsequently classified during the first pass. The memory means 47 may also be used to store the window and image type of each pixel at the end of the second pass. Typically, however, the image data is used immediately to process, transmit and/or print the image, and the image data is discarded.

The page segmentation and classification means 40 may also include image processing means 48 for processing the image data after each of the pixels has been labeled with an image type and as belonging to a particular window.

A page segmentation and classification apparatus embodying the invention might include a typical computer processor and software designed to accomplish each of the steps of the two pass method. The apparatus might also include image data obtaining means 36 for obtaining an image to be processed by the two pass method. The image data obtaining means 36 could include a scanner or a device for reading a stored image from a memory. The device might also include image data generation means 38 for generating image data to be segmented and classified by the two pass method. The image data generation means could include a software program for generating an image or a word processing program that generates a page of text or a page of mixed text and images.

It is to be appreciated that the outputs of the module 200 and module 202 are combined—as those skilled in the art will appreciate—in combining module 204 to output data that takes the form of four layered segmentation data. In this regard, the data may be stored in four separate files, one file for each layer, or a single file having four identifiable portions. Once the data is in this format, it may be used advantageously and selectively by the system for a variety of desired purposes that can be implemented in the system.

The output data is in modified form, as compared to the original image data. In certain circumstances, the modified data is of optimal form for particular applications. Preferably, the output data includes a background layer, a foreground layer, and a selector layer, obtained through the implementation of the block or object based method described above, and a rendering hints layer obtained through the implementation of the pixel based method described above. As to the pixel-based data, it preferably includes information (e.g. statistics) on each pixel type as well as information on the window corresponding to each pixel.

As an alternative, windowed objects identified by the pixel based segmentation process may be placed in separate partial planes so they can be readily extracted for editing or other suitable purposes.

Figure 8:
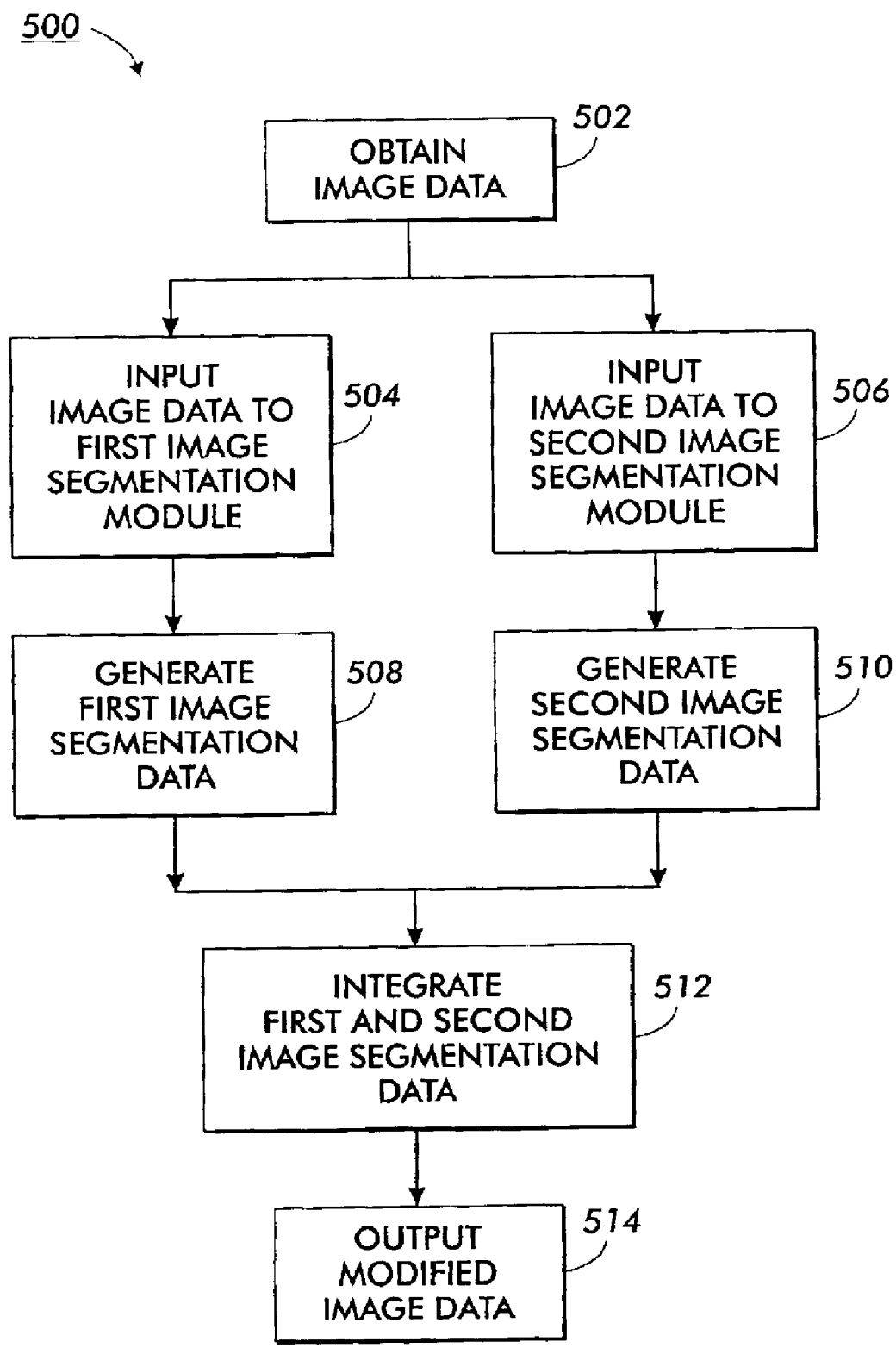

Referring to FIG. 8, a method according to the present invention is illustrated. The method 500 is initiated by obtaining image data (step 502). Initially, obtaining the image data may be accomplished using the scanning techniques discussed above (e.g. via scanner 12) as well as other well-known techniques (e.g. in the system of FIG. 2) in combination with other image processing and control procedures, such techniques and procedures typically being a function of the implementation. This image data is then input to a first segmentation module (step 504). Preferably, the first image segmentation module is a block or object based segmentation module 200 that is capable of generating MRC data representations. The image data is then input to a second image segmentation module (step 506). The second image segmentation module preferably takes the form of a pixel-based image segmentation module 202 that is operative to generate rendering hints that are useful in rendering the original image. In the preferred embodiment, the image data is input to both the first and second image segmentation modules concurrently or simultaneously.

The first image segmentation module then generates first segmentation data (step 508). The first image segmentation data preferably is MRC data that representatively includes layers of background data, foreground data, and selector data. Likewise, the second image segmentation module generates second segmentation data (step 510). As alluded to above, the second image segmentation data comprises rendering hints. These hints may take a variety of forms, but in the preferred embodiment, the rendering hints include statistics on the pixels and information on the corresponding windows—all such information tending to identify characteristics about the pixel such as whether such pixels are edge pixels or half-tone pixels. Preferably, these two tasks of generating data are accomplished concurrently. This could occur whether or not the image data is concurrently input to the respective segmentation modules.

Once steps 508 and 510 are complete, the first segmentation data is integrated with the second segmentation data (step 512). The integration of these two types of data is essentially a summing of the data forms. The resultant output data thus includes four total layers, three generated by the first segmentation module and one generated by the second segmentation module. That is, it includes a background layer, a foreground layer, and a selector layer—obtained through the implementation of the block or object based method described above—and a rendering hints layer representing the image data, or rendering hints—obtained through the implementation of the pixel based method described above. This summation of data may be accomplished using any suitable technique. Of course, the manner of integration may well be a function of the manner in which the output data is maintained and stored. In this regard, the four layers may be stored in separate files or in separate buffers. Likewise, the data may be stored in a single file or on a single storage medium having suitable demarcation capabilities.

It is important to note that some common cases can be specified in advance as "defaults", thus the image representation can be simplified. For example, in common documents the text is black. We can specify the default foreground to be black, and if the foreground layer is missing, it is understood to be black. In such cases, the foreground layer does not need to be generated and stored, thus simplifying the process and reduce storage space. Likewise, a common type of image is text of different colors on a white background. We can specify the default background to be white, and if the background layer is missing, it is understood to be white. In such cases, the apparent number of layers of the image representation can be reduced.

Last, the modified image data obtained as a result of the integration is output (step 514). Typically, image data is segmented most advantageously for the purposes of conducting data compression. Once compressed, the data is stored, transmitted and/or used for image rendering. In the case where the data is transmitted, the modified output data must be decompressed at the receiver or destination thereof. In the case of image rendering, the data is preferably decompressed prior to being provided to the print engine.

It should be appreciated that the present invention may be implemented using a variety of suitable hardware and software techniques, many of which are referenced above. However, any such suitable implementation techniques should be apparent to those skilled in the art upon a reading of the present description.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, we hereby claim:

1. A method for segmenting an image, the image comprising pixels and being represented by image data, the method comprising steps of:

obtaining image data;

inputting the image data into a first image segmentation module;

generating first segmentation data by the first image segmentation module, the first image segmentation data representing at least one first characteristic of the image data;

inputting the image data into a second image segmentation module;

generating second image segmentation data by the second image segmentation module, the second image segmentation data representing at least one second characteristic of the image data; and, integrating the first image segmentation data with the second image segmentation data to obtain modified image data.

2. The method as set forth in claim 1 wherein the inputting of the image data to the first image segmentation module and the inputting of the image data to the second image segmentation module are accomplished concurrently.

3. The method as set forth in claim 1 wherein the generating of the first image segmentation data comprises generating first characteristic data representing a background layer, a selector layer and a foreground layer of the image data.

4. The method as set forth in claim 1 wherein the generating of the second image segmentation data comprises generating second characteristic data representing rendering hints.

5. The method as set forth in claim 1 wherein the integrating of the first and second image segmentation data comprises generating the modified image data such that it comprises a background layer, a selector layer, and a foreground layer of the image data and a layer of information representing rendering hint for the image data.

6. The method as set forth in claim 1 wherein the first image segmentation module comprises an object based image segmentation module.

7. The method as set forth in claim 6 wherein the secon image segmentation module comprises a pixel based image segmentation module.

8. The method as set forth in claim 1 wherein the second image segmentation module comprises a pixel based image segmentation module.

9. A system for segmenting an image, the image comprising pixels and being represented by image data, the system comprising:

means for obtaining image data;

means for generating first segmentation data, the first image segmentation data representing at least one first characteristic of the image data;

means for generating second image segmentation data, the second image segmentation data representing at least one second characteristic of the image data; and, means for integrating the first image segmentation data with the second image segmentation data to obtain modified image data.

10. The system as set forth in claim 9 further comprising means for inputting the image data to the first image segmentation module and inputting the image data to the second image segmentation module concurrently.

11. The system as set forth in claim 9 wherein the first image segmentation data comprises first characteristic data representing a background layer, a selector layer and a foreground layer of the image data.

12. The system as set forth in claim 9 wherein the second image segmentation data comprises second characteristic data representing rendering hints.

13. The system as set forth in claim 9 wherein the modified image data comprises a background layer, a selector layer, and a foreground layer of the image data and a layer of information representing rendering hint for the image data.

14. The system as set forth in claim 9 wherein the means for generating the first segmentation data comprises a first segmentation module comprising an object based image segmentation module.

15. The system as set forth in claim 14 wherein the first segmentation module comprises a block based image segmentation module.

16. The system as set forth in claim 9 wherein the means for generating the second image segmentation data comprises a second image segmentation module comprising a pixel based image segmentation module.

17. The system as set forth in claim 6 wherein the means for generating the second image segmentation data comprises a second image segmentation module comprising a pixel based image segmentation module.

18. An image rendering system adapted for segmenting an image, the image comprising pixels and being represented by image data, the system comprising:

a scanner operative to obtain image data;

a bitmap generator operative to generate a bitmap corresponding to the image data;

a first image segmentation module operative to generate first image segmentation data, the first image segmentation data representing at least one first characteristic of the image data;

a second image segmentation module operative to generate second image segmentation data, the second image segmentation data representing at least one second characteristic of the image data;

a combining module operative to combine the first image segmentation data with the second image segmentation data to obtain modified image data;

a compression module operative to compress the modified image data;

a storage module operative to store the compressed image data;

a decompression module operative to decompress the stored image data; and, a print engine operative to render the image based on the decompressed data.

19. The system as set forth in claim 18 wherein the system is included in a xerographic printing environment.

20. The system as set forth in claim 18 wherein the print engine is a xerographic print engine.

21. The system as set forth in claim 18 wherein the first image segmentation data comprises first characteristic data representing a background layer, a selector layer and a foreground layer of the image data.

22. The system as set forth in claim 18 wherein the second image segmentation data comprises second characteristic data representing rendering hints.

23. The system as set forth in claim 18 wherein the first and second segmentation data comprises layers whereby an absence of a selected layer establishes a default position for a characteristic represented by the selected layer.

24. The system as set forth in claim 18 further comprising a third image segmentation module operative to generate third image segmentation data.

25. The system as set forth in claim 24 wherein the combining module is operative to combine the third image segmentation data with the first and second image segmentation data.

* * * * *